(12) United States Patent
Lubischer et al.

(10) Patent No.: US 10,029,724 B2
(45) Date of Patent: Jul. 24, 2018

(54) STEERING ASSEMBLY

(71) Applicant: STEERING SOLUTIONS IP HOLDING CORPORATION, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 68 days.

(21) Appl. No.: 15/044,532

(22) Filed: Feb. 16, 2016

(65) Prior Publication Data

US 2016/0347348 A1    Dec. 1, 2016

Related U.S. Application Data

(60) Provisional application No. 62/168,167, filed on May 29, 2015.

(51) Int. Cl.

| | |
|---|---|
| *G01C 22/00* | (2006.01) |
| *G06D 1/00* | (2006.01) |
| *B62D 1/181* | (2006.01) |
| *F16H 25/20* | (2006.01) |
| *B62D 1/02* | (2006.01) |
| *G05D 1/00* | (2006.01) |

(52) U.S. Cl.
CPC ............. *B62D 1/181* (2013.01); *B62D 1/02* (2013.01); *F16H 25/2025* (2013.01); *G05D 1/0088* (2013.01)

(58) Field of Classification Search
CPC ...... B62D 1/02; F16H 25/2025; G05D 1/0088
USPC ............................................................. 701/23
See application file for complete search history.

(56) References Cited

U.S. PATENT DOCUMENTS

| 4,337,967 A | 7/1982 | Yoshida et al. |
|---|---|---|
| 4,503,504 A | 3/1985 | Suzumura et al. |
| (Continued) | | |

FOREIGN PATENT DOCUMENTS

| CN | 103448785 A | 12/2013 |
|---|---|---|
| JP | S60157963 A | 8/1985 |
| JP | 2007253809 A | 10/2007 |

OTHER PUBLICATIONS

Chinese Office Action and Search Report for Chinese Application No. 2016103666609.X dated Dec. 20, 2017, 8 pages.

(Continued)

*Primary Examiner* — Maceeh Anwari
(74) *Attorney, Agent, or Firm* — Cantor Colburn LLP

(57) ABSTRACT

A steering assembly includes a steering wheel having a convenience feature, an environmental detection system, and a controller in communication with an autonomous vehicle. The steering wheel is selectively coupled to a steering shaft and is movable between a deployed position and a retracted position. The environmental detection system is configured to provide a cabin environmental signal. The controller is programmed to move the steering wheel towards the retracted position and operatively decouple the steering wheel from the steering shaft, while the steering wheel is in the deployed position and in response to a request to activate an advanced driver assist system and the cabin environmental signal indicating a clear path of travel of the steering wheel.

16 Claims, 4 Drawing Sheets

(56) References Cited

U.S. PATENT DOCUMENTS

| | | |
|---|---|---|
| 4,967,618 A | 11/1990 | Matsumoto et al. |
| 5,295,712 A | 3/1994 | Omura |
| 5,319,803 A | 6/1994 | Allen |
| 5,618,058 A | 4/1997 | Byon |
| 5,690,362 A | 11/1997 | Peitsmeier et al. |
| 5,893,580 A | 4/1999 | Hoagland et al. |
| 5,911,789 A | 6/1999 | Keipert et al. |
| 6,170,862 B1 | 1/2001 | Hoagland et al. |
| 6,227,571 B1 | 5/2001 | Sheng et al. |
| 6,373,472 B1 | 4/2002 | Palalau et al. |
| 6,390,505 B1 | 5/2002 | Wilson |
| 6,819,990 B2 | 11/2004 | Ichinose |
| 7,048,305 B2 | 5/2006 | Muller |
| 7,062,365 B1 | 6/2006 | Fei |
| 7,295,904 B2 | 11/2007 | Kanevsky et al. |
| 7,461,863 B2 | 12/2008 | Muller |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 8,002,075 B2 | 8/2011 | Markfort |
| 8,079,312 B2 | 12/2011 | Long |
| 8,146,945 B2 | 4/2012 | Born et al. |
| 8,260,482 B1 | 9/2012 | Szybalski et al. |
| 8,352,110 B1 | 1/2013 | Szybalski et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,899,623 B2 | 12/2014 | Stadler et al. |
| 8,909,428 B1 | 12/2014 | Lombrozo |
| 8,948,993 B2 | 2/2015 | Schulman et al. |
| 8,994,521 B2 | 3/2015 | Gazit |
| 9,002,563 B2 | 4/2015 | Green et al. |
| 9,031,729 B2 | 5/2015 | Lathrop et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,333,983 B2 | 5/2016 | Lathrop et al. |
| 9,360,865 B2 | 6/2016 | Yopp |
| 9,852,752 B1 | 12/2017 | Chou et al. |
| 2003/0227159 A1 | 12/2003 | Muller |
| 2006/0244251 A1 | 11/2006 | Muller |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2010/0222976 A1 | 9/2010 | Haug |
| 2010/0228417 A1 | 9/2010 | Lee et al. |
| 2010/0288567 A1 | 11/2010 | Bonne |
| 2012/0136540 A1 | 5/2012 | Miller |
| 2013/0002416 A1 | 1/2013 | Gazit |
| 2013/0292955 A1* | 11/2013 | Higgins ............... B60Q 9/00 292/195 |
| 2013/0325202 A1 | 12/2013 | Howard et al. |
| 2014/0111324 A1 | 4/2014 | Lisseman et al. |
| 2014/0300479 A1 | 4/2014 | Wolter et al. |
| 2014/0277896 A1* | 9/2014 | Lathrop ............... B62D 1/04 701/23 |
| 2014/0309816 A1 | 10/2014 | Stefan et al. |
| 2015/0002404 A1 | 1/2015 | Hooton |
| 2015/0032322 A1 | 1/2015 | Wimmer |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0246673 A1 | 4/2015 | Tseng et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0347347 A1 | 8/2016 | Lubischer |
| 2016/0347348 A1 | 8/2016 | Lubischer |
| 2016/0375931 A1 | 12/2016 | Lubischer |
| 2017/0029018 A1 | 2/2017 | Lubischer |

OTHER PUBLICATIONS

English Translation of Chinese Office Action and Search Report for Chinese Application No. 2016103666609.X dated Dec. 20, 2017, 8 pages.

* cited by examiner

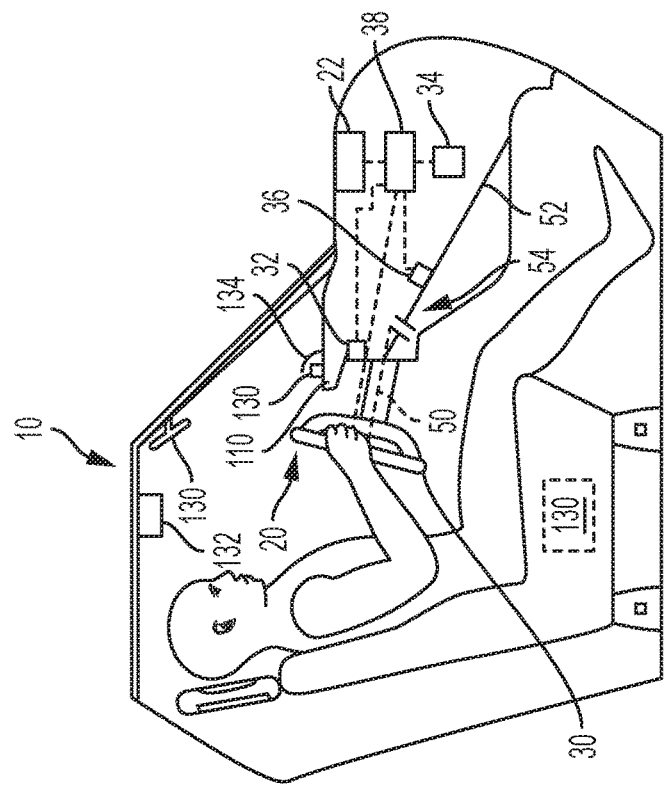
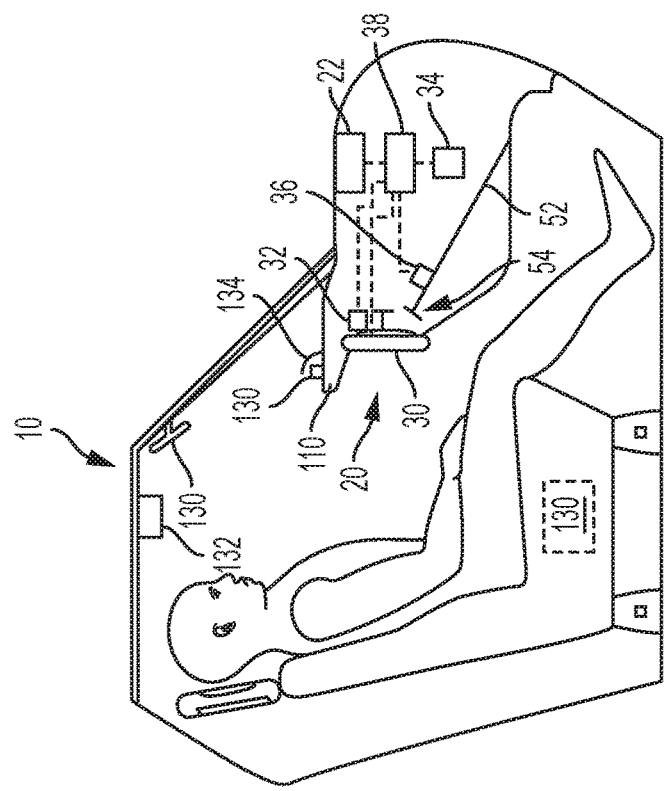

STEERING ASSEMBLY

CROSS-REFERENCES TO RELATED APPLICATIONS

This patent application claims priority to U.S. Provisional Patent Application Ser. No. 62/168,167, filed May 29, 2015, which is incorporated herein by reference in its entirety.

BACKGROUND OF THE INVENTION

The present invention relates to a steering assembly having a multi-function steering wheel.

Presently, vehicles are being developed having autonomous driving capabilities. During some autonomous driving events the steering wheel of the selectively autonomous vehicle is not necessary to control the selectively autonomous vehicle.

SUMMARY OF THE INVENTION

According to an embodiment of the present invention, a steering assembly is provided. The steering assembly includes a steering wheel, an advanced driver assist system, an environmental detection system, and a controller. The steering wheel is selectively coupled to a steering shaft and the steering wheel is movable between a deployed position and a retracted position. The advanced driver assist system is in communication with the steering wheel and is configured to selectively control an autonomous vehicle. The environmental detection system is configured to provide a cabin environmental signal. The controller is in communication with the advanced driver assist system. The controller is programmed to, while the steering wheel is in the retracted position, move the steering wheel towards the deployed position and operatively couple the steering wheel to the steering shaft, in response to a request to deactivate the advanced driving assisted system and the cabin environmental signal indicating a clear path of travel of the steering wheel.

According to another embodiment of the present invention, a steering assembly is provided. The steering assembly includes a steering wheel having a convenience feature, an environmental detection system, and a controller in communication with an autonomous vehicle. The steering wheel is selectively coupled to a steering shaft and is movable between a deployed position and a retracted position. The environmental detection system is configured to provide a cabin environmental signal. The controller is programmed to move the steering wheel towards the retracted position and operatively decouple the steering wheel from the steering shaft, while the steering wheel is in the deployed position and in response to a request to activate an advanced driver assist system and the cabin environmental signal indicating a clear path of travel of the steering wheel.

According to yet another embodiment of the present invention, a selectively autonomously controlled vehicle is provided. The selectively autonomously controlled vehicle includes a controller in communication with a steering assembly and a plurality of vehicle sensors. The controller embodies an autonomous driving assisted system. The steering assembly includes an environmental detection system and a steering wheel. The environmental detection system includes a cabin environmental sensor configured to provide a signal to the controller indicative of a condition within the vehicle compartment. The steering wheel is selectively coupled to a steering shaft. The controller switches the steering wheel from a rotatable state to a non-rotating state and decouples the steering wheel from the steering shaft, in response to the activation of the autonomous driving assisted system and the signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 a side view of a vehicle compartment having a steering assembly in a retracted position;

FIG. 2 is a side view of the vehicle compartment having the steering assembly in a deployed position;

DETAILED DESCRIPTION

Figure 4:
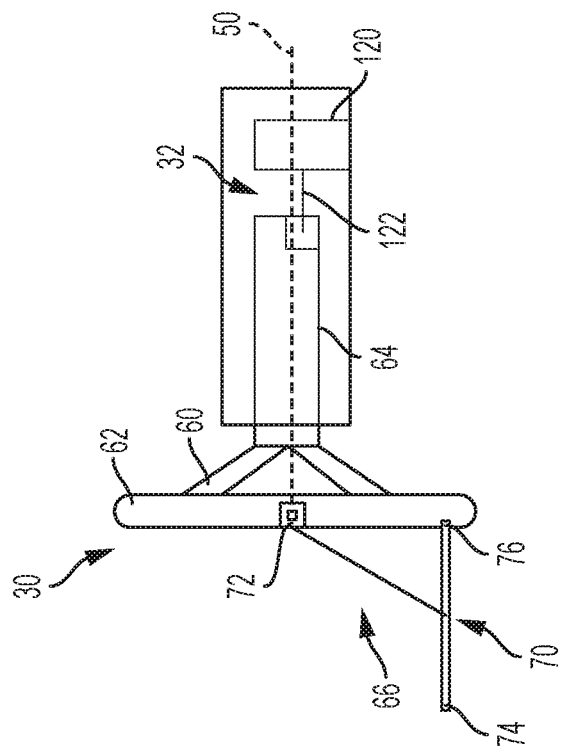
FIG. 4 is a side view of the steering assembly in the retracted position having the convenience feature in an extended position.

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 and 2, a side view of a vehicle compartment 10 of an autonomous vehicle, an autonomously driven vehicle, or a selectively autonomous vehicle is shown. The selectively autonomous vehicle is provided with a steering assembly 20 and an advanced driver assist system (ADAS) 22 such that the autonomous vehicle, the autonomously driven vehicle, or the selectively autonomous vehicle is able to perform operations without continuous input from a driver (e.g. steering, accelerating, braking, maneuvering, etc.). The ADAS 22 allows the selectively autonomous vehicle to be at least partially autonomously controlled using sensing, steering, and/or braking technology. A driver of the selectively autonomous vehicle is able to selectively activate or deactivate the ADAS 22 via a switch or other mechanism. A driver of the selectively autonomous vehicle is able to operate the selectively autonomous vehicle without providing an input to a component of the steering assembly 20 while the ADAS 22 is activated.

The steering assembly 20 includes a steering wheel 30, an adjustment assembly 32, an environmental detection system 34, a torque-displacement sensor 36, and a controller 38. The steering wheel 30 is operatively connected to a steering column that extends along a steering column axis 50. The steering wheel 30 is selectively coupled to a steering shaft 52 that extends through the steering column along the steering column axis 50. The steering wheel 30 may be directly or indirectly coupled to the steering shaft 52 through a coupling mechanism 54. The coupling mechanism 54 may include a disconnect clutch. The steering wheel 30 is coupled to the steering shaft 52 when the disconnect clutch of the coupling mechanism 54 is at least partially engaged and the ADAS 22 is deactivated. The steering wheel 30 is decoupled from the steering shaft 52 when the disconnect clutch of the coupling mechanism 54 is disengaged and the ADAS 22 is activated.

In at least one embodiment, the coupling mechanism 54 is configured as a component of a steer by wire system that electrically couples the steering wheel 30 to the steering shaft 52. The coupling mechanism 54 may include a device, such as a rotary encoder, that interprets rotation of the steering wheel 30 and applies information to an actuator that rotates the steering shaft 52 that pivots a pair of vehicle wheels. The device provides a signal to the actuator when the ADAS 22 is deactivated. The device does not provide a signal or is ignored by the actuator when the ADAS 22 is activated.

The steering wheel 30 is switchable between a rotating state/rotatable state and a non-rotating state. The steering wheel 30 is able to be rotated when the ADAS 22 is deactivated. The driver of the selectively autonomous vehicle is able to provide directional control of the selectively autonomous vehicle through the steering wheel 30 when the ADAS 22 is deactivated. The steering wheel 30 is in a non-rotating state when the ADAS 22 is activated. The steering wheel 30 is inhibited from rotating in the non-rotating state. The steering wheel 30 is in the non-rotating state when the steering wheel 30 is operatively decoupled from the steering shaft 52. In at least one embodiment, when the ADAS 22 is activated, the steering shaft 52 counter rotates such that no rotation of the steering wheel 30 is caused by the performance of steering maneuvers controlled by the ADAS 22. It is to be appreciated that "decoupling: the steering wheel 30 from the steering shaft 52 may be done mechanically, electrically, or a combination thereof.

Referring to FIGS. 3-6, the steering wheel 30 includes a core 60, a rim 62 at least partially disposed about the core 60, a steering member 64 extending from the core 60, and a convenience feature 66. The convenience feature 66 is disposed on the steering wheel 30, more specifically disposed within or on the core 60. The convenience feature 66 is enabled, by the controller 38, to be deployed or operated in response to at least one of the steering wheel 30 being in the retracted position, the steering wheel 30 being operatively decoupled from the steering shaft 52, and the steering wheel 30 being in a non-rotating state.

Figure 3:
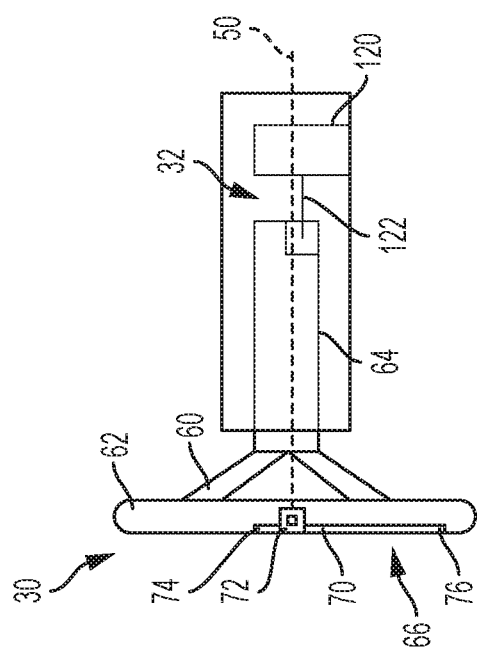
FIG. 3 is a side view of the steering assembly in the retracted position, having a convenience feature in a stowed position.

Referring to FIGS. 3 and 4, the convenience feature 66 includes an extensible member 70 and a locking mechanism 72. The extensible member 70 is operatively connected to the steering wheel 30. The extensible member 70 is pivotally or slidably connected to at least one of the core 60 and the rim 62. The extensible member 70 includes a first end 74 and a second end 76. The second end 76 of the extensible member 70 is pivotally or slidably connected to at least one of the core 60 and the rim 62. The extensible member 70 is movable between a stowed position and an extended position. The first end 74 of the extensible member 70 engages the locking mechanism 72 when the extensible member 70 is in the stowed position. The first end 74 of the extensible member 70 does not engage or is disengaged from the locking mechanism 72 when the extensible member 70 is in the extended position. The extensible member 70 is configured as at least one of a work surface, a tray table, a tray table having a cup holder, a cup holder, and a platform. It is to be understood that the preceding list of examples is not exhaustive, but is merely illustrative of features that a user may find convenient.

The locking mechanism 72 is in communication with the controller 38. The locking mechanism 72 is configured to inhibit movement of the extensible member 70 away from the stowed position when at least one of the ADAS 22 is deactivated, the steering wheel 30 is operatively coupled to the steering shaft 52, the steering wheel 30 is in a deployed position, and the steering wheel 30 is able to be rotated. The locking mechanism 72 is at least one of a latch, hook, magnet, or the like that engages at least one of a first end 74 of the extensible member 70. The locking mechanism 72 is configured to permit movement of the extensible member 70 between the stowed position and the extended position when at least one of the ADAS 22 is activated, the steering wheel 30 is operatively decoupled from the steering shaft 52, the steering wheel 30 is in a retracted position, and the steering wheel 30 is in a non-rotating state.

Figure 6:
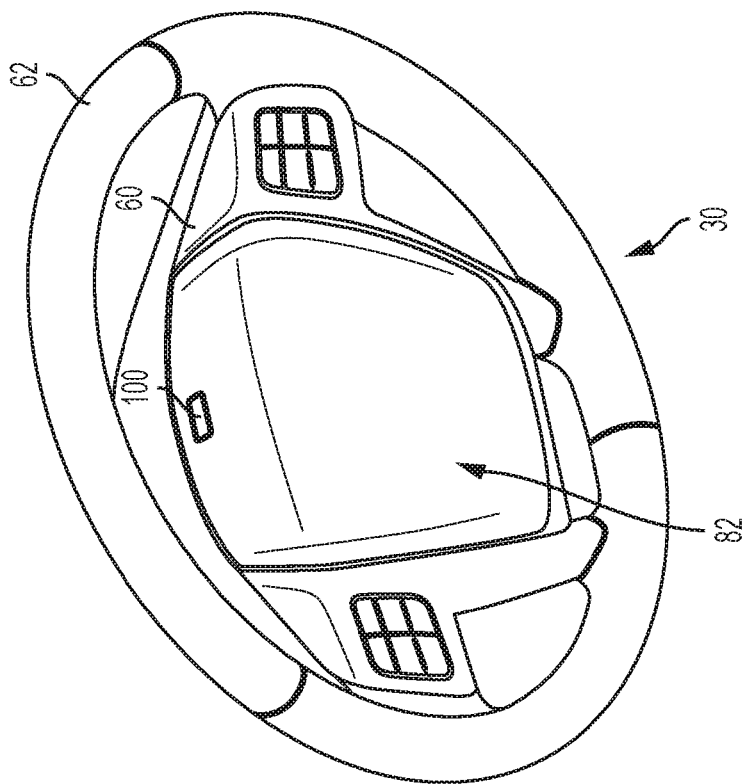
FIG. 6 is a perspective view of the steering wheel having the convenience feature with the access panel in a closed position.
Figure 5:
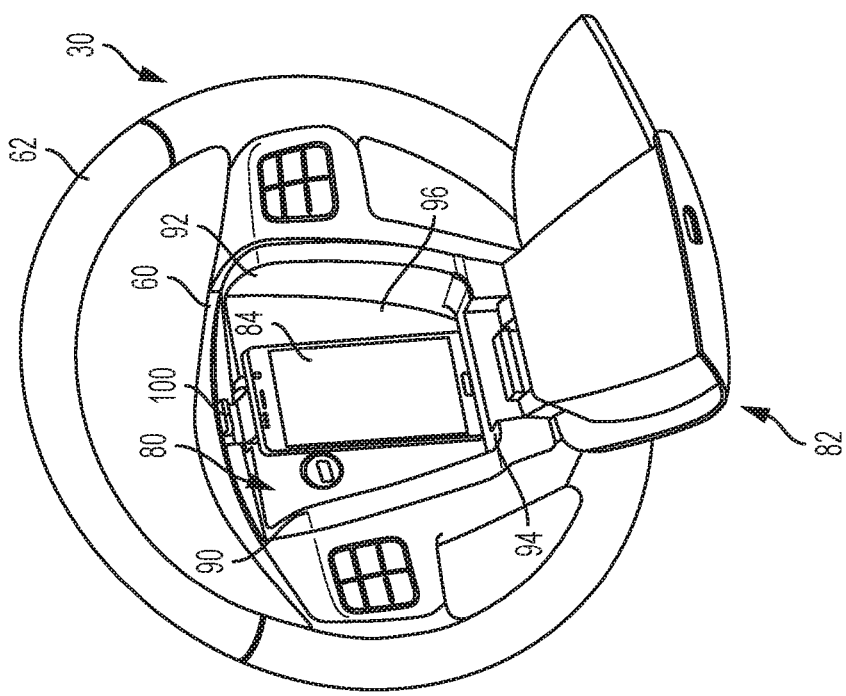
FIG. 5 is a perspective view of a steering wheel having a convenience feature with an access panel in an open position.

Referring to FIGS. 5 and 6, the convenience feature 66 is configured as a recess 80 that is selectively concealed by an access panel 82. The recess 80 is defined by the core 60 of the steering wheel 30. The recess 80 is sized to receive a nomadic device 84. The nomadic device 84 is a mobile electronic device, a cellular phone, a two-way radio, a personal computer, a GPS, a tablet computing device, a portable electronic device, or the like.

The recess 80 extends from a surface of the core 60 of the steering wheel 30 towards the steering shaft 52. The recess 80 includes a first wall 90, a second wall 92, a third wall 94, and a fourth wall 96. A surface of at least one of the first wall 90, the second wall 92, the third wall 94, and the fourth wall 96 is configured as a non-slip surface. The nomadic device 84 engages at least one of the first wall 90, the second wall 92, the third wall 94, and the fourth wall 96.

The first wall 90 is spaced apart from and disposed opposite the second wall 92. The first wall 90 and the second wall 92 are disposed generally parallel to each other. The third wall 94 extends between the first wall 90 and the second wall 92. The third wall 94 is disposed substantially perpendicular to the first wall 90 and the second wall 92. The fourth wall 96 extends between the first wall 90, the second wall 92, and the third wall 94. The fourth wall 96 is disposed closer to the steering shaft 52 than the first wall 90, the second wall 92, and the third wall 94.

The access panel 82 is pivotally or hingedly connected to the steering wheel 30 to permit or inhibit access to the recess 80. More specifically, the access panel 82 is connected to the core 60. As shown in FIGS. 5 and 6, the access panel 82 is movable between an open position that permits access to the recess 80 and a closed position that inhibits access to the recess 80.

A locking feature 100 is provided. The locking feature 100 is disposed proximate the recess 80. The locking feature 100 is in communication with the controller 38. The locking feature 100 is configured to inhibit movement of the access panel 82 away from the closed position when at least one of the ADAS 22 is deactivated, the steering wheel 30 is operatively coupled to the steering shaft 52, the steering wheel 30 is in a deployed position, and the steering wheel 30 is able to be rotated. The locking feature 100 is at least one of a latch, hook, magnet, protrusion, or the like that engages a portion of the access panel 82. The locking feature 100 is configured to permit movement of the access panel 82 between the closed position and the open position when at least one of the ADAS 22 is activated, the steering wheel 30 is operatively decoupled from the steering shaft 52, the steering wheel 30 is in a retracted position, and the steering wheel 30 is in a non-rotating state.

Figure 7:
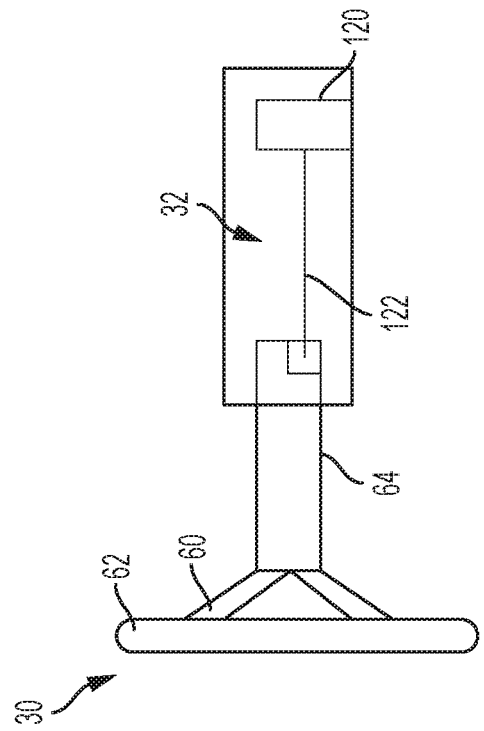
FIG. 7 is a side view of the steering assembly in the retracted position.
Figure 8:
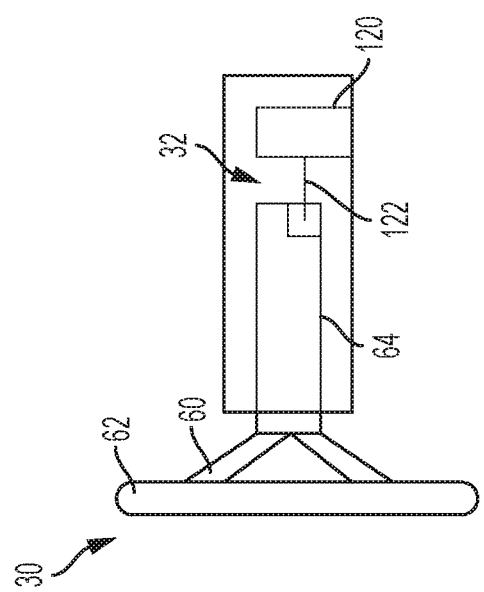
FIG. 8 is a side view of the steering assembly in the deployed position.

Referring to FIGS. 1, 2, 7, and 8, the steering wheel 30 is movable between a retracted position, FIGS. 1 and 7, and a deployed position, FIGS. 2 and 8, by the adjustment assembly 32. The retracted position corresponds to a position in which the steering wheel 30 is displaced away from the driver and towards/into the selectively autonomous vehicle instrument panel 110. The retracted position provides increased space within the vehicle compartment 10 for the driver of the selectively autonomous vehicle to perform non-driving activities. In at least one embodiment, the steering wheel 30 is disposed below the selectively autonomous vehicle instrument panel eyebrow.

The deployed position corresponds to a driving position of the steering wheel in which the steering wheel 30 is able to be rotated and the driver of the selectively autonomous vehicle is able to provide steering input to the steering wheel 30 to steer the selectively autonomous vehicle.

The adjustment assembly 32 is in communication with the controller 38. The adjustment assembly 32 includes an actuator 120 and an extension member 122. The actuator 120 is disposed proximate the steering column. In at least one embodiment, the actuator 120 is disposed within the selectively autonomous vehicle instrument panel 110. The actuator 120 is at least one of an electronic actuator, a hydraulic actuator, a pneumatic actuator, or the like.

The extension member 122 is operatively coupled to the actuator 120 and at least one of the steering wheel 30 and the steering shaft 52. The extension member 122 is at least one of a lead screw, a sliding shaft, or the like. The actuator 120 and the extension member 122 are arranged to move the steering wheel 30 between the deployed position and the retracted position.

The adjustment assembly 32 is configured to move the steering wheel 30 from the retracted position towards the deployed position in response to a request to deactivate the ADAS 22. As the steering wheel 30 moves towards the deployed position or subsequent to the steering wheel 30 achieving the deployed position, the coupling mechanism 54 operatively couples the steering wheel 30 to the steering shaft 52.

The adjustment assembly 32 is configured to move the steering wheel 30 from the deployed position towards the retracted position in response to a request to activate the ADAS 22. As the steering wheel 30 moves towards the retracted position or prior to the steering wheel 30 moving towards the retracted position, the coupling mechanism 54 operatively decouples the steering wheel 30 from the steering shaft 52.

The environmental detection system 34 is in communication with the controller 38. The environmental detection system 34 is configured to monitor conditions within the vehicle compartment 10 that may impact the activation or deactivation of the ADAS 22 or the retraction or deployment of the steering wheel 30. The environmental detection system 34 includes a cabin environmental sensor 130 and an output device 132. The cabin environmental sensor 130 provides a cabin environmental signal to the controller 38. The cabin environmental signal provides information indicative of at least one of the following conditions: an obstacle between the steering wheel 30 and the driver, an object within a path of travel of the steering wheel 30, the location of the driver, the availability or unavailability of the driver (e.g. the driver asleep within the driver's seat, the driver not within the driver's seat, a pet or other object in the driver's lap, etc.) undesirable vehicle dynamics, objects disposed within or on the convenience feature 66.

The output device 132 is configured to output an indicator such as a visual, a haptic, or an audible indicator in response to the cabin environmental signal providing information indicative of the following conditions: an obstacle between the steering wheel 30 and the driver, an object within a path of travel of the steering wheel 30, a location of the driver, and unavailable driver (e.g. the driver asleep within the driver's seat, the driver not within the driver's seat, a pet or other object in the driver's lap, etc.) undesirable vehicle dynamics, objects disposed within or on the convenience feature 66. The indicator provides a notification to the driver. In at least one embodiment, the output device 132 outputs the indicator in response to a sensor associated with the ADAS 22 indicating an unsafe condition external to the vehicle compartment 10. The output device 132 may be provided as part of the selectively autonomous vehicle audio system, the selectively autonomous vehicle warning system, or a separate system capable of providing audio or visual outputs.

The cabin environmental sensor 130 is disposed within a sensor housing 134. The sensor housing 134 is disposed on or is integrally formed with the steering column of the steering assembly 20. In at least one embodiment, the cabin environmental sensor 130 is disposed within the vehicle compartment 10 above the steering assembly 20. In at least one embodiment, the cabin environmental sensor 130 is disposed within or proximate the driver's seat. The cabin environmental sensor 130 is at least one of a weight sensor, an optical sensor, an ultrasonic sensor, a seatback sensor, a thermal sensor, and a biometric sensor configured to detect a heartbeat or respiration of the driver of the selectively autonomous vehicle.

The adjustment assembly 32 is inhibited, by the controller 38, from moving the steering wheel 30 from the retracted position towards the deployed position in response to the cabin environmental signal indicating at least one of the above identified conditions, while the ADAS 22 is activated, and the steering wheel 30 is operatively decoupled from the steering shaft 52. The adjustment assembly 32 is commanded, by the controller 38, to move the steering wheel 30 from the retracted position towards the deployed position based on the cabin environmental signal not indicating at least one of the above identified conditions within the vehicle compartment 10 while the ADAS 22 is activated and the steering wheel 30 is operatively decoupled from the steering shaft 52.

The adjustment assembly 32 is inhibited, by the controller 38, from moving the steering wheel 30 from the deployed position towards the retracted position based on the cabin environmental signal indicating at least one of the above identified conditions while the ADAS 22 is deactivated and the steering wheel 30 is operatively coupled to the steering shaft 52. In at least one embodiment, the adjustment assembly 32 is inhibited, by the controller 38, from moving the steering wheel 30 from the deployed position towards the retracted position based on a sensor associated with the ADAS 22 indicating an unsafe condition external to the vehicle compartment 10.

The adjustment assembly 32 is commanded, by the controller 38, to move the steering wheel 30 from the deployed position towards the retracted position based on the cabin environmental signal indicating a clear path of travel of the steering wheel by the cabin environmental signal not indicating at least one of the above identified conditions, while the ADAS 22 is deactivated and the steering wheel 30 is operatively coupled to the steering shaft 52. In at least one embodiment, the adjustment assembly 32 is commanded, by the controller 38, to move the steering wheel 30 from the deployed position towards the retracted position based on a sensor associated with the ADAS 22 not indicating an unsafe condition external to the vehicle compartment 10.

The torque-displacement sensor 36 is in communication with the controller 38. The torque-displacement sensor 36 is disposed proximate at least one of the steering wheel 30 and the steering shaft 52. The torque-displacement sensor 36 is configured to output a signal, to the controller 38, indicative of a torque applied to the steering wheel 30 about the steering column axis. The torque-displacement sensor 36 is configured to output a signal, to the controller 38, indicative of displacement of the steering wheel 30 along the steering column axis. The adjustment assembly 32 is commanded, by the controller 38, to move the steering wheel 30 from the deployed position towards the retracted position in response to the application of at least one of a torque greater than a torque threshold and a displacement greater than a displacement threshold while the ADAS 22 is activated, the steering wheel 30 is in the retracted position, and the steering wheel is operatively decoupled from the steering shaft 52. In response to the movement of the steering wheel 30 from the deployed position towards the retracted position, the coupling mechanism 54 is configured to operatively couple the steering wheel 30 to the steering shaft 52.

The controller 38 may be provided as part of the ADAS 22. In at least one embodiment, the controller 38 embodies the ADAS 22. In at least one embodiment, the controller 38 is provided as a separate component from the ADAS 22 and is in communication with the autonomous vehicle, the autonomously driven vehicle, or the selectively autonomous vehicle. The controller 38 is in communication with a plurality of vehicle sensors including the cabin environmental sensor 130 of the environmental detection system 34 as well as other vehicle sensors in communication with the ADAS 22 such as occupant detection sensors, forward object detection sensors, rearward object detection sensors, ultrasonic sensors, etc.

The controller 38 interprets the various signals provided by the steering assembly 20, the ADAS 22, the environmental detection system 34, and the plurality of vehicle sensors to determine whether to activate or deactivate the ADAS 22 and output various warnings or alerts. The controller 38 issues commands to and receive signals from the steering wheel 30, the adjustment assembly 32, environmental detection system 34, the torque-displacement sensor 36, and the steering shaft 52. These commands and signals may result in the steering wheel 30 being operatively coupled or operatively decoupled from the steering shaft 52, the steering wheel 30 being in a retracted position or a deployed position, the steering wheel 30 being in a rotating condition or a non-rotating condition, and the output of indicators to the driver of the selectively autonomous vehicle.

The controller 38 includes a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 38 in controlling the steering assembly 20 and the ADAS 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering assembly, comprising:
   a steering wheel selectively coupled to a steering shaft, the steering wheel movable between a deployed position and a retracted position;
   an advanced driver assist system in communication with the steering wheel, the advanced driver assist system configured to selectively control an autonomous vehicle;
   an environmental detection system configured to provide a cabin environmental signal; and
   a controller in communication with the advanced driver assist system, the controller programmed to, while the steering wheel is in the retracted position, move the steering wheel towards the deployed position and operatively couple the steering wheel to the steering shaft, in response to a request to deactivate the advanced driver assist system and the cabin environmental signal indicating a clear path of travel of the steering wheel and while the steering wheel is in the deployed position, in response to a request to activate to the advanced driver assist system and the cabin environmental signal indicating a clear path of travel of the steering wheel, move the steering wheel towards the retracted position.

2. The steering assembly of claim 1, further comprising an adjustment assembly in communication with the controller, the adjustment assembly including:
   an actuator disposed proximate the steering wheel, and
   an extension member operatively coupled to the actuator and at least one of the steering wheel and the steering shaft, the extension member and the actuator arranged to move the steering wheel between the deployed position and the retracted position.

3. The steering assembly of claim 2, further comprising a torque-displacement sensor disposed proximate the steering shaft, the torque-displacement sensor in communication with the controller.

4. The steering assembly of claim 3, wherein the controller is programmed to, while the steering wheel is in the retracted position, in response to at least one of a torque applied to the steering wheel greater than a torque threshold and a displacement of the steering wheel greater than a displacement threshold, move the steering wheel towards the deployed position and operatively couple the steering wheel to the steering shaft.

5. The steering assembly of claim 2, wherein the environmental detection system is disposed proximate the steering assembly.

6. The steering assembly of claim 5, wherein the controller is further programmed to, in response to the cabin environmental signal indicating an object within a path of travel of the steering wheel, activate at least one of a visual, a haptic, and an audible indicator.

7. The steering assembly of claim 5, wherein the controller is further programmed to, in response to the cabin environmental signal indicating an unavailable driver of a vehicle, activate at least one of a visual, a haptic, and an audible indicator.

8. The steering assembly of claim 1, wherein an operative decoupling of the steering wheel from the steering shaft inhibits rotation of the steering wheel.

9. A steering assembly, comprising:
   a steering wheel having a convenience feature is selectively coupled to a steering shaft and is movable between a deployed position and a retracted position;
   an environmental detection system configured to provide a cabin environmental signal; and
   a controller programmed to: while the steering wheel is in the deployed position, in response to a request to activate an advanced driver assist system and the cabin environmental signal indicating a clear path of travel of the steering wheel, move the steering wheel towards the retracted position and operatively decouple the steering wheel from the steering shaft, and while the steering is in the retracted position, in response to a request to deactivate the advance driver assist system and the cabin environmental signal indicating another clear path of travel of the steering wheel, move the steering wheel towards the deployed position.

10. The steering assembly of claim 9, further comprising an adjustment assembly that includes an extension member operatively coupled to an actuator and at least one of the steering wheel and the steering shaft, the adjustment assembly configured to move the steering wheel between the deployed position and the retracted position.

11. The steering assembly of claim 9, wherein the convenience feature includes:
   an extensible member operatively connected to the steering wheel, the extensible member movable between a stowed position and an extended position; and
   a locking mechanism configured to inhibit movement of the extensible member away from the stowed position.

12. The steering assembly of claim 11, wherein the controller is further programmed to, in response to the steering wheel being operatively decoupled from the steering shaft and the steering wheel in a non-rotating state, enable the locking mechanism to permit movement of the extensible member between the stowed position and the extended position.

13. The steering assembly of claim 9, wherein the convenience feature includes an access panel movably connected to the steering wheel, the access panel configured to selectively permit access to a recess defined within a core of the steering wheel configured to receive a nomadic device.

14. The steering assembly of claim 13, wherein the controller is further programmed to, in response to the steering wheel being operatively decoupled from the steering shaft and the steering wheel in a non-rotating state, enable the access panel to move from a closed position towards an open position to permit access to the recess.

15. The steering assembly of claim 9, wherein the environmental detection system includes a cabin environmental sensor is disposed within a sensor housing.

16. The steering assembly of claim 15, wherein the controller is programmed to, in response to cabin environmental signal indicating an unsafe condition within a vehicle compartment, output an indicator indicative of the unsafe condition.

* * * * *